(12) United States Patent
Asaka et al.

(10) Patent No.: US 6,469,778 B2
(45) Date of Patent: Oct. 22, 2002

(54) COHERENT LASER RADAR SYSTEM AND TARGET MEASUREMENT METHOD

(75) Inventors: Kimio Asaka, Tokyo (JP); Yoshihito Hirano, Tokyo (JP); Takayuki Yanagisawa, Tokyo (JP); Shusou Wadaka, Tokyo (JP); Yasuisa Ooga, Tokyo (JP); Etsuo Sugimoto, deceased, late of Hyogo (JP), by Kyoko Suimoto, legal representative

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/758,421

(22) Filed: Jan. 12, 2001

(65) Prior Publication Data
US 2001/0009458 A1 Jul. 26, 2001

(30) Foreign Application Priority Data
Jan. 20, 2000 (JP) ........................................ 2000-011985

(51) Int. Cl.[7] .............................. G01P 3/36; G01C 3/08
(52) U.S. Cl. .................... 356/28.5; 356/5.09; 356/5.15
(58) Field of Search ..................... 356/27, 28.5, 3.01, 356/5.15; 342/104, 117

(56) References Cited
U.S. PATENT DOCUMENTS

| 3,571,549 | A | * | 3/1971 | Doyle et al. ................ 200/199 |
| 3,649,124 | A | * | 3/1972 | Takaoka et al. ................ 356/5 |
| 3,725,926 | A | * | 4/1973 | Ares .......................... 343/17.5 |
| 3,742,500 | A | * | 6/1973 | Freedman .................... 343/7.7 |
| 3,858,203 | A | * | 12/1974 | Constant ..................... 343/6.5 |
| 4,164,628 | A | * | 8/1979 | Ward et al. .................... 179/15 |
| 4,190,361 | A | * | 2/1980 | Dubrunfaut ..................... 356/5 |
| 4,460,987 | A | * | 7/1984 | Stokes et al. ................ 367/103 |
| 4,594,000 | A | * | 6/1986 | Falk et al. ....................... 356/5 |
| 4,652,879 | A | * | 3/1987 | Rudish et al. ............... 342/371 |
| 4,743,110 | A | * | 5/1988 | Arnaud et al. .................. 356/5 |

(List continued on next page.)

OTHER PUBLICATIONS

Vadlowsky et al., "Optical Fibers and Amplifiers for WDM Systems," IEEE, Nov. 1997, pp. 1765–1779.*

Primary Examiner—Thomas H. Tarcza
Assistant Examiner—Brian Andrea

(57) ABSTRACT

A coherent laser radar system includes a pulsed laser oscillating a pulsed laser beam which is split into two parts by an optical divider. A first part of the two is transmitted as a transmitted beam via a beam splitter. A second part is supplied to a delay line via a coupling optics and others to be delayed by a predetermined time as a local beam, and is incident onto an optical coupler. The received beam from the target is incident onto the optical coupler via a scanning optics and so on. A photodetector carries out the coherent detection of the light beam coupled by the optical coupler. A signal processor computes a target velocity and the like from a signal generated by the detection and converted into a digital signal by an A/D converter. This makes it possible to solve a problem of a conventional system in that the system configuration is complicated and expensive.

9 Claims, 10 Drawing Sheets

U.S. PATENT DOCUMENTS

| | | | |
|---|---|---|---|
| 4,902,127 A | | 2/1990 | Byer et al. ...................... 356/5 |
| 4,990,925 A | * | 2/1991 | Edelsohn et al. ............ 342/424 |
| 5,062,083 A | * | 10/1991 | Geren et al. .................... 367/1 |
| 5,170,218 A | * | 12/1992 | Keene ....................... 356/28.5 |
| 5,237,331 A | | 8/1993 | Henderson et al. ........... 342/54 |
| 5,272,513 A | * | 12/1993 | Vahala et al. .............. 356/28.5 |
| 5,315,307 A | * | 5/1994 | Tsui et al. .................. 342/444 |
| 5,317,376 A | * | 5/1994 | Amajerdian et al. ....... 356/28.5 |
| 5,335,106 A | * | 8/1994 | Paquin et al. ............... 359/180 |
| 5,384,572 A | * | 1/1995 | Michaels et al. ........... 342/169 |
| 5,510,890 A | * | 4/1996 | Langdon et al. ........... 356/5.09 |
| 5,589,929 A | * | 12/1996 | Li ............................. 356/5.01 |
| 5,621,514 A | * | 4/1997 | Paranto et al. ............. 356/5.09 |
| 5,734,486 A | * | 3/1998 | Guillemot et al. .......... 359/139 |
| 5,835,199 A | * | 11/1998 | Phillips et al. ............. 356/5.03 |
| 5,847,816 A | * | 12/1998 | Zediker et al. ............ 356/5.09 |
| 5,847,817 A | * | 12/1998 | Zediker et al. ............ 356/5.09 |
| 5,872,628 A | * | 2/1999 | Erskine ....................... 356/345 |
| 6,100,516 A | * | 8/2000 | Nerin et al. ............. 250/206.2 |
| 6,100,965 A | * | 8/2000 | Nerin ........................ 356/5.09 |
| 6,141,086 A | * | 10/2000 | Vahala et al. .............. 356/28.5 |
| 6,222,964 B1 | * | 4/2001 | Sadot et al. .................. 385/40 |
| 6,233,045 B1 | * | 5/2001 | Suni et al. ................. 356/28.5 |
| 6,239,736 B1 | * | 5/2001 | McDonald et al. ........... 342/28 |
| 6,285,288 B1 | * | 9/2001 | Langdon et al. ............ 340/603 |

* cited by examiner

PULSE WIDTH: τ

(a) TRANSMITTED PULSE (b) RECEIVED BEAM (c) LOCAL BEAM (LIGHT PULSE)

(d) BEAT SIGNAL

COHERENT LASER RADAR SYSTEM AND TARGET MEASUREMENT METHOD

BACKGROUND OF THE INVENTION

1. Field of the Invention

The present invention relates to a coherent laser radar system and a target measurement method for measuring physical information such as a target distance, velocity, density distribution and velocity distribution of the target, and particularly to a coherent laser radar system and a target measurement method utilizing a pulsed laser oscillating a single-wavelength (single-frequency) pulsed laser beam as a light source.

2. Description of Related Art

As devices for measuring physical information such as the target distance, velocity, density distribution and velocity distribution of the target, there are a pulse Doppler radar system utilizing microwaves or millimeter waves and a coherent laser radar system utilizing light waves (laser beam). Because of the difference between their frequencies, the former can perform wide-range, long-distance measurements, whereas the latter can perform measurements at high spatial resolution and high velocity resolution.

In soft target measurements, such as measurements of wind velocity and wind velocity distribution, the pulse Doppler radar system handles raindrops and particles of mist or cloud in atmosphere as scatterers, and computes the wind velocity from the Doppler shift of the echo. Accordingly, it is difficult for the pulse Doppler radar system to measure the clear-air turbulence because not enough echo is captured in clear weather in which there are no raindrops, particles of mist or cloud in the atmosphere.

In contrast with this, the coherent laser radar system can measure the wind velocity and wind velocity distribution even in clear weather because it utilizes the laser beam and hence can achieve enough scattering intensity in aerosol in the atmosphere. Thus, the coherent laser radar system installed in an airport or aircraft is expected to serve as a device for detecting obstacles such as turbulence. There are two types of coherent laser radar systems: one employs as its light source a pulsed laser that oscillates a single frequency pulsed laser beam; and the other uses as its light source a continuous wave (CW) laser that oscillates a single frequency continuous laser beam.

FIG. 16 is a block diagram showing a configuration of a conventional coherent-laser radar system disclosed in U.S. Pat. No. 5,237,331, for example. The conventional coherent laser radar system utilizes an injection-seeding pulsed laser as its light source.

In FIG. 16, the reference numeral 101 designates a CW laser light source for oscillating a single-frequency CW laser beam; 102 designates an optical divider for dividing part of the CW laser beam as a local beam; 103 designates a frequency shifter for shifting the frequency of the CW laser beam; 104 designates an injection-seeding pulsed laser for generating a pulsed laser beam utilizing the CW laser beam as a seed beam; 105 designates an optical divider for dividing the pulsed laser beam; 106 designates a beam splitter for reflecting the light beam supplied from the optical divider 105 using the difference in polarization direction, and for transmitting the light beam supplied from a quarter-wave plate 107; 107 designates the quarter-wave plate for converting a linearly polarized beam with a certain polarization direction with respect to the crystallographic axis to a circularly polarized beam, and for converting a circularly polarized beam into a linearly polarized beam; 108 designates a transceiver optics for supplying a scanning optics 109 with a beam from the quarter-wave plate 107, and for supplying the quarter-wave plate 107 with a beam from the scanning optics 109 along the same optical path; and 109 designates the scanning optics for transmitting a transmitted beam to a target, and for receiving a scattered beam from the target as a received beam.

The reference numeral 110 designates an optical divider for dividing the local beam; 111 designates an optical coupler for coupling the local beam divided by the optical divider 110 with the pulsed laser beam divided by the optical divider 105; 112 designates an optical coupler for coupling the local beam divided by the optical divider 110 with the received beam passing through the beam splitter 106; 113 designates a photodetector for detecting a light beam output from the optical coupler 111; 114 designates a photodetector for detecting a light beam output from the optical coupler 112; 115 designates an A/D converter for converting the electric signals which are detected and generated by the photodetectors 113 and 114 into digital signals; and 116 designates a signal processor for computing the physical information such as the target distance, velocity, density distribution and velocity distribution in response to the two digital detection signals output from the A/D converter 115.

The reference numeral 117 designates a controller for controlling an adjuster 118 in response to the signal supplied from the signal processor 116; and 118 designates the adjuster such as a piezoelectric device for adjusting the cavity length of the injection-seeding pulsed laser 104.

FIG. 17 is a block diagram showing a configuration of the signal processor 116 of the conventional coherent laser radar system. In this figure, the reference numeral 121 designates a memory unit for temporarily storing the digital signals fed from the A/D converter 115; 122 designates a time gate for selecting from the digital signals stored in the memory unit 121 the digital signals corresponding to the received beam from a particular range; 123 designates a window processor for executing window processing such as Hanning window processing or Hamming window processing; 124 designates an FFT section for carrying out fast Fourier transform (FFT); and 125 designates a Doppler frequency detector for detecting the Doppler frequency in response to the signal passing through the Fourier transform.

Next, the operation of the conventional radar system will be described.

FIG. 18 is a timing chart illustrating the operation of the conventional coherent laser radar system.

The CW laser light source 101 oscillates the CW laser beam at a single frequency $f_0$ (that is, at a single wavelength), and supplies it to the optical divider 102. The optical divider 102 divides the CW laser beam into two portions. A first one of the two CW laser beams is used as the local beam, and the second one is supplied to the frequency shifter 103. The local beam is further divided into two portions by the optical divider 110, and they are supplied to the optical couplers 111 and 112. On the other hand, the frequency shifter 103 increases the frequency of the CW laser beam by $f_{IF}$, and supplies the injection-seeding pulsed laser 104 with the CW laser beam with the frequency $f_0+f_{IF}$ as the seed beam.

The injection-seeding pulsed laser 104 oscillates the single frequency (that is, single wavelength) pulsed laser beam in the axial mode at a frequency closest to the seed beam. The pulsed laser beam output from the injection-seeding pulsed laser 104 is divided by the optical divider 105 into two parts, and a first part is incident on the beam splitter 106, whereas a second part is incident on the optical coupler 111.

The pulsed laser beam output from the injection-seeding pulsed laser 104, linearly polarized beam with a particular polarization direction, is reflected off the beam splitter 106 and is incident on the quarter-wave plate 107. The quarter-wave plate 107 converts it to the circularly polarized beam which is transmitted the to a target as the transmitted beam via the transceiver optics 108 and the scanning optics 109.

The pulsed laser beam thus transmitted to the target is scattered by the target, and part of the scattered beams is incident on the scanning optics 109.

The scattered beam from the target, that is, the received beam, reversely proceeds along the same optical path as the transmitted beam through the scanning optics 109 and the transceiver optics 108, and is incident on the quarter-wave plate 107. The quarter-wave plate 107 rotates the polarization direction of the received beam so that it becomes a linearly polarized beam whose polarization direction is rotated by 90 degrees with respect to the pulsed laser beam, and supplies it to the beam splitter 106.

The beam splitter 106 transmits the received beam, and supplies it to the optical coupler 112. The optical coupler 112 couples the received beam with the local beam, and supplies the coupled beam to the photodetector 114. The photodetector 114 carries out the coherent detection of the coupled beam, and supplies the A/D converter 115 with the electric signal generated by the detector.

On the other hand, the optical coupler 111 couples the pulsed laser beam split by the optical divider 105 with the local beam, and supplies the coupled beam to the photodetector 113. The photodetector 113 carries out the coherent detection of the coupled beam, and supplies the electric signal generated by the detector to the A/D converter 115.

The A/D converter 115 samples the electric signals fed from the photodetectors 113 and 114, and supplies them to the signal processor 116 as the digital signals. The signal processor 116 computes in response to the signal from the photodetector 114 the target distance from the temporal waveform of the signal intensity and the target velocity from the Doppler signal component of the signal.

To achieve accurate measurement, the frequency of the local beam and that of the pulsed laser beam must have a fixed relationship during the sampling. Thus, the CW laser light source 101 must have a high frequency stability. For example, assuming that the CW laser beam used as the local beam has a wavelength of 2 micrometers, the maximum measurement range is 15 kilometers, and the measurement error of the target velocity is less than 0.1 m/s, the frequency fluctuations of the CW laser beam in 0.1 millisecond must be less than 100 kHz. To achieve such a high frequency stability, it is necessary to use a CW laser with a complicated structure, to select an appropriate wavelength and to maintain the temperature stability and power supply stability at a high level.

The signal processor 116 stores into the memory unit 121 the signal which corresponds to the coupled beam of the received beam and local beam sampled by the A/D converter 115 (the beat signal shown in FIG. 18). The sampling duration of the A/D converter 115 is from the pulse oscillation to the reception of the scattered beam from a target located at the maximum measurement range.

To obtain the information about the target at a given distance, the time gate 122 extracts from the sampled signal stored in the memory unit 121 a portion including the scattered beam from the target, and supplies it to the window processor 123. The window processor 123 performs the window processing of the sampled signal to improve the frequency measurement accuracy. Thus, the signals with waveforms as shown in FIG. 18 are obtained.

The FFT section 124 calculates the spectrum of the signal after the window processing. The Doppler frequency detector 125 detects the Doppler frequency and computes the target velocity.

In this way, the conventional coherent laser radar system measures the target velocity and the like.

The signal output from the photodetector 113 is used to improve the calculation accuracy of the target distance and velocity. As described above, since the injection-seeding pulsed laser 4 oscillates the pulse at the frequency closest to the frequency of the seed beam in the axial mode, it is necessary to monitor the frequency difference between the pulsed laser beam and the local beam to obtain an accurate Doppler signal. To achieve this, the optical dividers 105 and 110 extract part of the pulsed laser beam and part of the local beam, respectively, and the photodetector 113 carries out the coherent detection of the signal generated by coupling the two signals by the optical coupler 111. Furthermore, the A/D converter 115 samples the detected signal in the same manner as the received beam, and the signal processor 116 computes the frequency difference between the pulsed laser beam and the local beam, and supplies the controller 117 with the signal for controlling the frequency of the pulsed laser beam in response to the calculation result.

The frequencies of the seed beam, pulsed laser beam, received beam, frequency monitoring signal and received signal $f_S$, $f_T$, $f_R$, $f_M$ and $f_{sig}$ can be expressed as follows.

$$f_S = f_o + f_{IF}$$

$$f_T = f_S + \Delta f$$

$$f_R = f_T + f_d$$

$$f_M = f_{IF} + \Delta f$$

$$f_{sig} = f_M + f_d$$

where $f_0$ is the frequency of the local beam, $\Delta f$ is the frequency difference between the pulsed laser beam and the seed beam and $f_d$ is the target Doppler frequency. The frequency monitoring signal is used for stabilizing the oscillation frequency of the pulsed laser beam.

Accordingly, the target Doppler frequency $f_d$ becomes the difference between the frequency $f_{sig}$ of the received signal and the frequency $f_M$ of the frequency monitoring signal.

To achieve the stable injection seeding operation, the controller 117 controls the adjuster 118 that regulates the cavity length of the injection-seeding pulsed laser 104, thereby adjusting the frequency of the pulsed laser beam. The signal processor 116 supplies the controller 117 with the frequency difference $\Delta f$ between the pulsed laser beam and the local beam in response to the frequency $f_M$ of the frequency monitoring signal. The controller 117 controls the adjuster 118 such that the frequency difference $\Delta f$ becomes less than a predetermined value or zero, thereby regulating the cavity length of the injection-seeding pulsed laser 104 to adjust the frequency of the pulsed laser beam.

In this way, the injection-seeding pulsed laser 104 produces a stable single mode (single wavelength) pulsed laser beam.

With the foregoing configuration, it is necessary for the conventional coherent laser radar system to comprise the CW laser as the local light source besides the pulsed laser for generating the transmitted beam to perform the coherent detection. In addition, since the CW laser must oscillate the single frequency CW laser beam at a high frequency stability, it becomes complicated in its structure. Moreover, the mechanism is necessary for monitoring the frequency difference between the transmitted pulsed laser beam and the local beam. As a result, the configuration of the system becomes complex, which presents a problem of making it difficult to reduce the cost and size of the system and to increase its reliability.

SUMMARY OF THE INVENTION

The present invention is implemented to solve the foregoing problem. It is therefore an object of the present invention to provide a simple structure, low cost, small size and highly reliable coherent laser radar system. This is implemented by transmitting a single frequency (single wavelength) pulsed laser beam to a target and receiving its response from the target, by delaying part of the pulsed laser beam and coupling it with the received beam, and by carrying out coherent detection of the coupled beam, thereby obviating the need for the CW laser light source and the mechanism for monitoring the frequency difference between the transmitted pulsed laser beam and the local beam.

According to a first aspect of the present invention, there is provided a coherent laser radar system comprising: a pulsed laser for oscillating a single wavelength pulsed laser beam; optical dividing means for dividing the pulsed laser beam oscillated by the pulsed laser, and for outputting first part of the pulsed laser beam as a transmitted beam and second part of the pulsed laser beam as a local beam; transceiver optical means for transmitting the transmitted beam to a target, and for receiving a light beam from the target as a received beam; a delay line for delaying the local beam output from the optical dividing means; optical coupling means for coupling the received beam with the local beam output from the delay line; a photodetector for carrying out coherent detection of a light beam output from the optical coupling means; and a signal processor for obtaining physical information about the target from the signal passing through the coherent detection by the photodetector.

Here the delay line may comprise an optical fiber with a predetermined length.

The delay line may comprise: an optical divider for dividing the local beam output from the optical dividing means into n light signals, where n is a positive integer greater than one; n delay lines for providing the n light signals with different delay times; and an optical coupler for coupling the n light signals delay by the n delay lines.

The delay line may comprise: a loop line; and an optical coupler for guiding the local beam output from the optical dividing means into the loop line, and for dividing part of the local beam traveling around the loop line.

The delay line may comprise an optical amplifier at a midpoint of the loop line.

The coherent laser radar system may further comprise an optical amplifier connected between the delay line and the optical coupling means for amplifying the local beam.

The optical amplifier may be an optical fiber amplifier.

The optical amplifier may be a semiconductor optical amplifier.

The optical amplifier may be a laser amplifier composed of a solid-state laser medium.

The optical coupler may be a variable optical coupler whose dividing ratio is variable.

The optical coupler may comprise: an optical switch consisting of an acoustooptic device for supplying the loop line with one of the local beam output from the optical dividing means and the local beam traveling around the loop line; and an optical divider for dividing the local beam traveling around the loop line.

The coherent laser radar system may further comprise an A/D converter for converting the signal output from the photodetector into digital data, and for supplying the digital data to the signal processor.

The signal processor may comprise: a time gate for enabling the digital data output from the A/D converter to be input to the signal processor as information data in response to the local beam; an FFT (fast Fourier transform) section for computing a spectrum of the information data; and a Doppler frequency detector for detecting a Doppler frequency and for computing the physical information of the target from the spectrum output from the FFT section.

According to a second aspect of the present invention, there is provided a target measurement method comprising the steps of: oscillating a single wavelength pulsed laser beam; dividing the pulsed laser beam into a first part used as a transmitted beam and a second part used as a local beam; transmitting the transmitted beam to a target, and receiving a light beam from the target as a received beam; delaying the local beam; coupling the received beam with the local beam delayed; carrying out coherent detection of the coupled light beam; and obtaining physical information about the target from the signal passing through the coherent detection.

BRIEF DESCRIPTION OF THE DRAWINGS

FIG. 2 is a block diagram showing another configuration of the signal processor in FIG. 1;

DETAILED DESCRIPTION OF THE PREFERRED EMBODIMENTS

The invention will now be described with reference to the accompanying drawings.

EMBODIMENT 1

Figure 1:
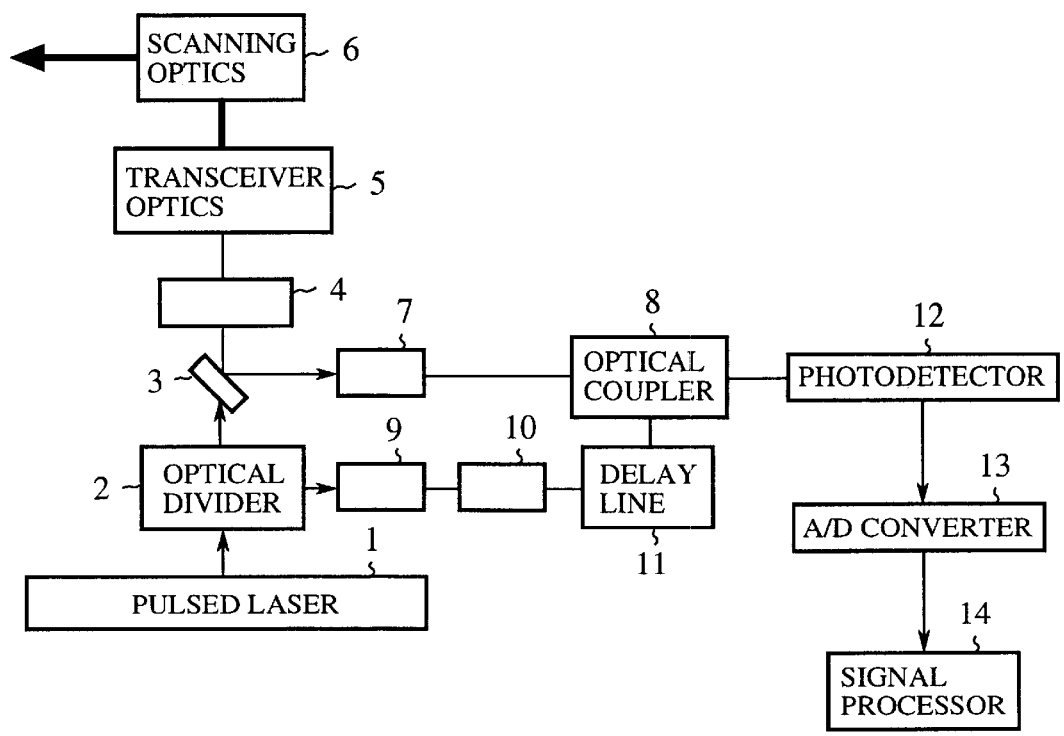
FIG. 1 is a block diagram showing a configuration of an embodiment 1 of the coherent laser radar system in accordance with the present invention.

FIG. 1 is a block diagram showing a configuration of an embodiment 1 of the coherent laser radar system in accordance with the present invention. In this figure, the reference numeral 1 designates a pulsed laser for oscillating a single frequency (single wavelength) pulsed laser beam; 2 designates an optical divider for dividing the pulsed laser beam; 3 designates a beam splitter for separating the optical path of a transmitted beam from that of a received beam using the difference in the polarization direction; 4 designates a quarter-wave plate for converting a linearly polarized beam with a predetermined polarization direction with respect to the crystallographic axis into a circularly polarized beam, and for converting a circularly polarized beam into a linearly polarized beam; 5 designates a transceiver optics for supplying the light beam from the quarter-wave plate 4 to a scanning optics 6, and the light beam from the scanning optics 6 to the quarter-wave plate 4 along the same optical path; and 6 designates the scanning optics for transmitting a transmitted beam to a target, and for receiving a scattered beam or reflected beam from the target as the received beam. The transceiver optics 5 and the scanning optics 6 constitutes a transceiver optical means for transmitting the pulsed laser beam generated by the pulsed laser 1 to the target, and for receiving the light beam from the target as the received beam.

The reference numeral 7 designates a coupling optics for launching the received beam from the beam splitter 3 into an optical coupler 8; 8 designates the optical coupler for coupling the received beam with the pulsed laser beam which is frequency shifted and delayed; 9 designates a coupling optics for launching the pulsed laser beam divided by the optical divider 2 into a frequency shifter 10; 10 designates the frequency shifter for increasing the frequency of the divided pulsed laser beam by a predetermined frequency; and 11 designates a delay line for delaying the laser beam by a predetermined time.

The reference numeral 12 designates a photodetector for performing coherent detection of the light beam coupled by the optical coupler 8; 13 designates an A/D converter for converting the electric signal detected and generated by the photodetector 12 into a digital signal; and 14 designates a signal processor for determining the physical information such as target velocity and target distance from the signal passing through the coherent detection.

Figure 2:
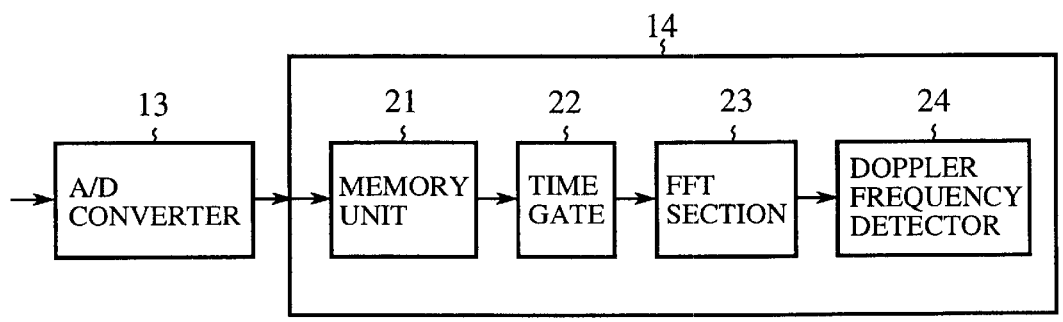
FIG. 2 is a block diagram showing a configuration of the signal processor in FIG. 1.

FIG. 2 is a block diagram showing a configuration of the signal processor of FIG. 1. In FIG. 2, the reference numeral 21 designates a memory unit for temporarily storing the digital signal supplied from the A/D converter 13; 22 designates a time gate for selecting from the digital signal stored in the memory unit 21 the digital signal corresponding to the received beam from a particular range; 23 designates an FFT section for performing the fast Fourier transform; and 24 designates a Doppler frequency detector for detecting the Doppler frequency from the signal passing through the Fourier transform.

Figure 3:
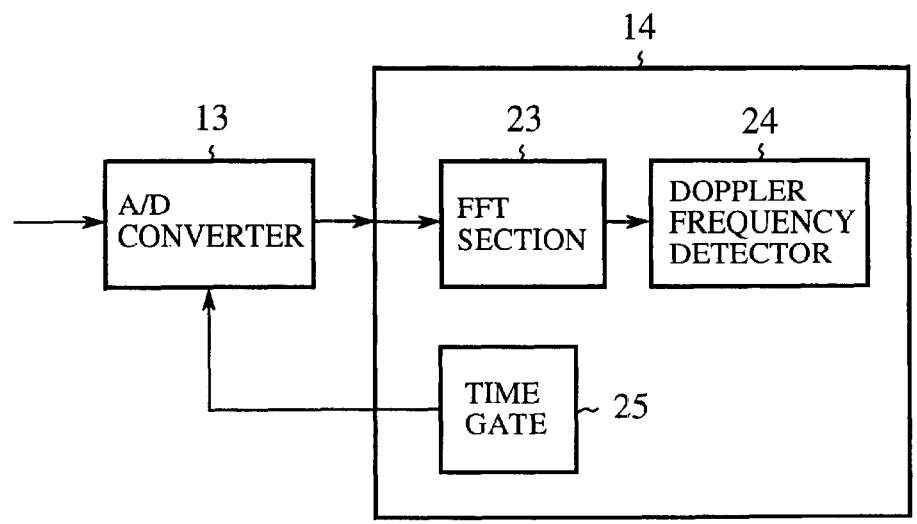

FIG. 3 is a block diagram showing another configuration of the signal processor as shown in FIG. 1. In FIG. 3, the reference numeral 25 designates a time gate for enabling the A/D converter 13 only for a time period corresponding to the received beam from the particular range.

Next, the operation of the present embodiment 1 will be described.

Figure 4:
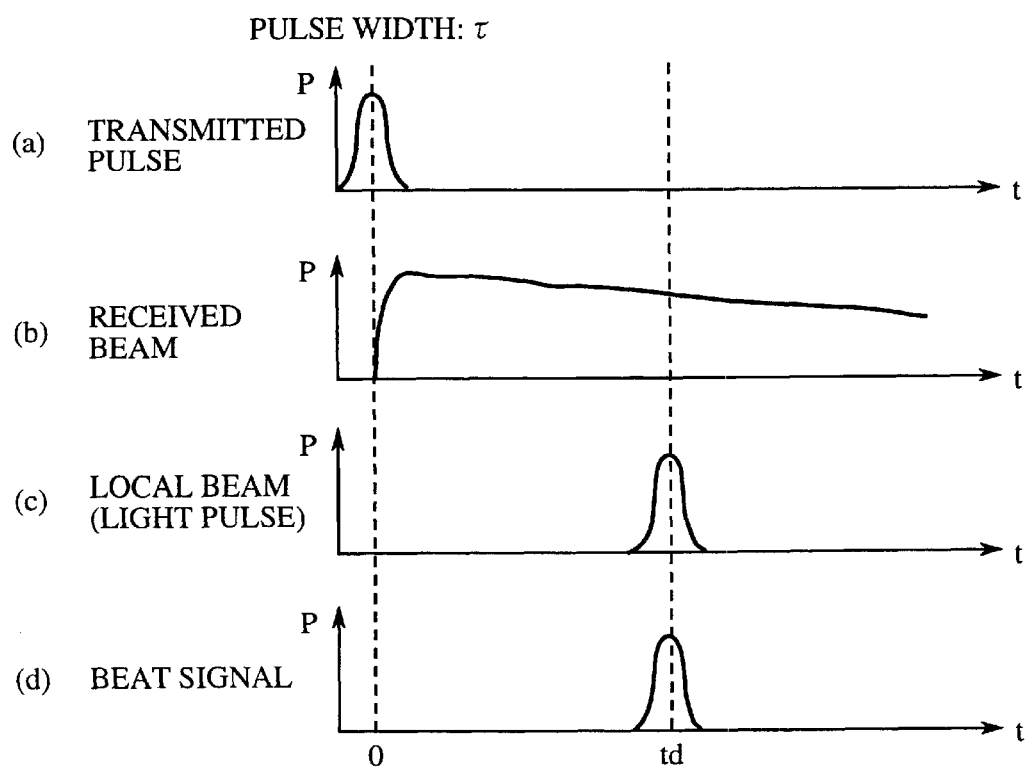
FIG. 4 is a timing chart illustrating the operation of the embodiment 1 of the coherent laser radar system.

FIG. 4 is a timing chart illustrating the operation of the embodiment 1 of the coherent laser radar system, in which case the target is assumed to be a soft target such as atmosphere.

The pulsed laser 1 oscillates the single frequency (single wavelength) pulsed laser beam. The pulsed laser beam is divided by the optical divider 2 into two parts, one of which is incident on the beam splitter 3, and the other of which is incident on the frequency shifter 10 via the coupling optics 9 as the local beam. Here, the local beam proceeds through an optical fiber connected to the coupling optics 9 and is incident on the frequency shifter 10. The frequency shifter 10 increases the frequency of the local beam by a predetermined intermediate frequency, and launches it into the delay line 11. The delay line 11 delays the local beam by a predetermined time period, and launches it into the optical coupler 8.

On the other hand, the pulsed laser beam incident on the beam splitter 3 passes through the beam splitter 3, and is incident on the quarter-wave plate 4. The quarter-wave plate 4 converts it to the circularly polarized beam, followed by transmitting the pulsed laser beam to the target via the transceiver optics 5 and the scanning optics 6 as the transmitted beam.

The pulsed laser beam thus transmitted to the target is scattered or reflected by the target, and part of the scattered beam or reflected beam is received by the scanning optics 6.

The received beam from the target reversely proceeds along the same optical path as the transmitted beam through the scanning optics 6 and the transceiver optics 5, and is incident on the quarter-wave plate 4. The quarter-wave plate 4 rotates the polarization direction of the received beam so that it becomes the linearly polarized beam whose polarization direction is rotated by 90 degrees with respect to the pulsed laser beam, and supplies it to the beam splitter 3.

The beam splitter 3 reflects off the received beam whose polarization direction differs from that of the pulsed laser beam, and launches the reflected received beam into the optical coupler 8 via the coupling optics 7. Here, the received beam proceeds along the optical fiber connected to the coupling optics 7, and is incident on the optical coupler 8. The optical coupler 8 couples the received beam with the local beam fed from the delay line 11, and supplies the coupled beam to the photodetector 12. The photodetector 12 carries out the coherent detection (optical heterodyne detection) of the coupled beam, and supplies the A/D converter 13 with the electric signal generated by the detection.

The A/D converter 13 samples the electric signal fed from the photodetector 12, and supplies the sampled data to the signal processor 14 as the digital signal. The signal processor 14 computes the target velocity and the like from the signal supplied from the photodetector 12. In this case, the measurement range of the target is determined by the delay time by the delay line 11. In other words, only the target is measured which is located at a distance that will provide the transmitted beam with a delay equal to the delay time by the delay line 11 from the transmission of the transmitted beam to the reception of the received beam.

The signal processor 14 as shown in FIG. 2 stores in the memory unit 21 the signal corresponding to the coupled beam (beat signal as shown in FIG. 4) generated by combining the received beam sampled by the A/D converter 13 with the local beam as illustrated in FIG. 4. The frequency of the beat signal is the sum of the intermediate frequency and the Doppler frequency. The beat signal is obtained only during the time when the local pulse is present which is derived from the pulsed laser beam.

The time gate 22 extracts from the sampled signal stored in the memory unit 21 a portion including the beat signal. The FFT section 23 computes the spectrum from the extracted signal. The Doppler frequency detector 24 detects the Doppler frequency and computes the target velocity.

Since the local beam is derived from the pulsed laser beam, the electric signal after the detection is also pulsating. This obviates the need for the window processing required in the conventional system, and hence serves to simplify the configuration of the system.

When using the signal processor 14 as shown in FIG. 3, the time gate 25 enables the A/D converter 13 only during the time the photodetector 12 receives the local beam so that the beat signal is supplied to the FFT section 23 only during that time period. Thus, the signal processor 14 can obviate the memory unit 21, which serves to further simplify the system configuration.

As described above, the present embodiment 1 is configured such that it transmits the single frequency pulsed laser beam to the target and receives it therefrom, delays part of the pulsed laser beam to be coupled with the received beam, and carries out the coherent detection of the coupled beam. This makes it possible to obviate both the CW laser light source and device for monitoring the frequency difference between the transmitted pulsed laser beam and the local beam, which serves to simplify the system configuration, offering an advantage of being able to implement a low cost, small size and highly reliable system.

Incidentally, the delay line 11 can consist of a long optical fiber, for example, so that the delay time can be easily adjusted by changing the length of the optical fiber. Winding the optical fiber around a reel provides a miniature, low loss delay line, offering an advantage of being able to reduce the system size. In addition, using a polarization-preserving optical fiber makes it possible to reduce the fluctuations of the polarization state of the local beam.

Although the optical divider 2 for extracting part of the pulsed laser beam is provided outside the cavity of the pulsed laser 1 in the present embodiment 1 as shown in FIG. 1, this is not essential. For example, it is also possible for the cavity to include an optical component having a function of the optical divider 2 to extract part of the pulsed laser beam, offering a similar advantage.

EMBODIMENT 2

Figure 5:
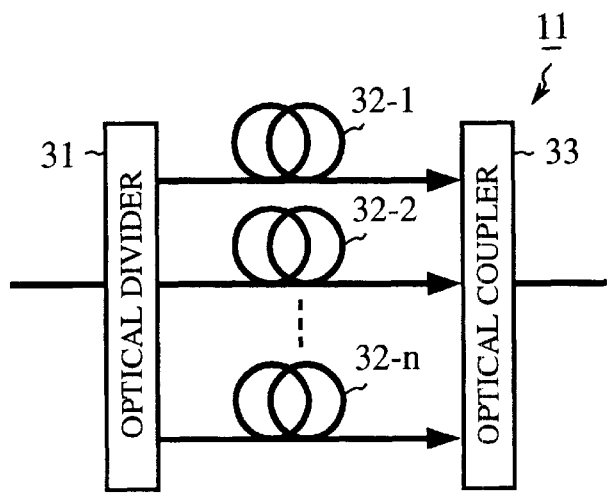
FIG. 5 is a block diagram showing a configuration of the delay line of an embodiment 2 of the coherent laser radar system in accordance with the present invention.

FIG. 5 is a block diagram showing a configuration of the delay line of an embodiment 2 of the coherent laser radar system in accordance with the present invention. The delay line 11 as shown in FIG. 5 comprises an optical divider 31 for splitting the incident local beam to n light beams, where n is greater than one; n delay lines 32-1–32-n for providing the n light beams with different delay times; and an optical coupler 33 for coupling the n light beams passing through the n delay lines.

Since the remaining configuration of the present embodiment 2 of the coherent laser radar system is the same as that of the embodiment 1 (FIG. 1), the description thereof is omitted here.

Next, the operation of the present embodiment 2 will be described.

Figure 6:
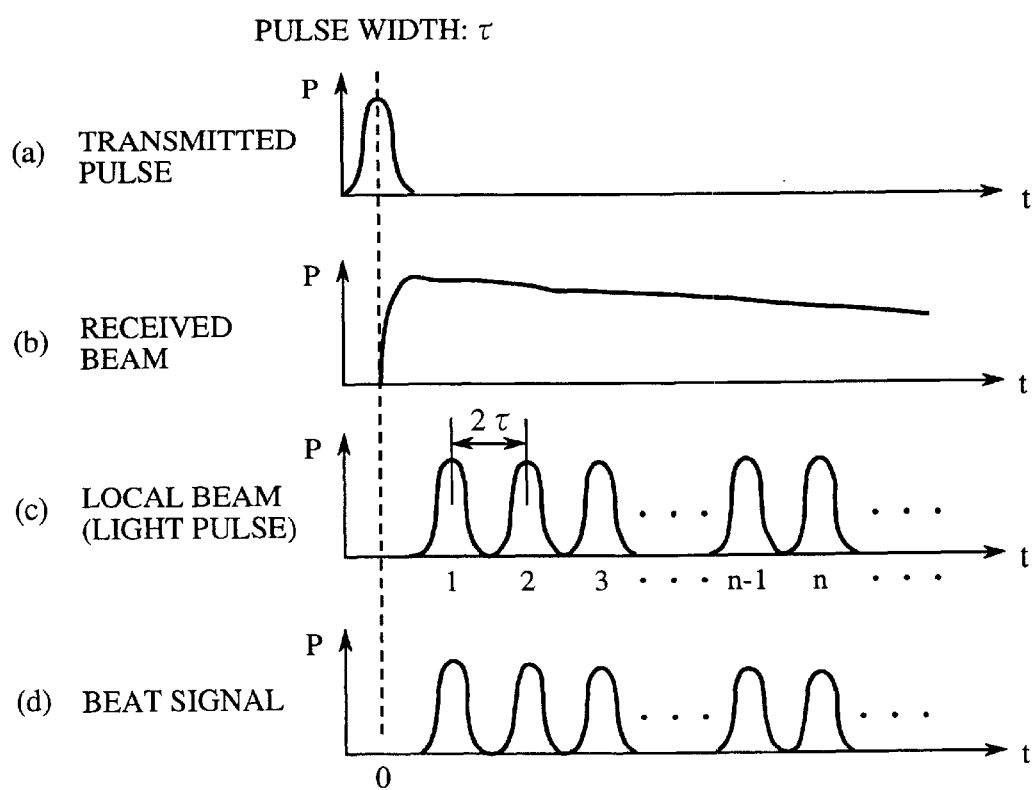
FIG. 6 is a timing chart illustrating the operation of the embodiment 2 of the coherent laser radar system.

FIG. 6 is a timing chart illustrating the operation of the present embodiment 2 of the coherent laser radar system, in which case, the target is assumed to be a soft target like atmosphere.

In the delay line 11 of the embodiment 2, the optical divider 31 is connected with the optical coupler 33 through the n delay lines 32-1–32-n with different delay times. Thus, the local beam consisting of n pulses is generated from part of the pulsed laser beam (one pulse) as illustrated in FIG. 6 which illustrates the local beam in which the difference between the delay times of the delay lines 32-i and 32-(i+1) is twice the pulse width τ. Since the remaining operation is the same as that of the embodiment 1, the description thereof is omitted here, though the time gate 22 or 25 of the signal processor 14 extracts the beat pulses corresponding to the individual pulses of the local beam in accordance with their positions on the time axis, and supplies them to the FFT section 23. The FFT section 23 and Doppler frequency detector 24 compute the target velocities at the ranges corresponding to the individual pulses.

The foregoing embodiment 1 of the coherent laser radar system utilizes the local beam consisting of a single pulse, and hence can measure the target velocity and the like of only one target at a certain distance. In contrast with this, the present embodiment 2 of the coherent laser radar system can capture a plurality of beat signals associated with the received pulses from a plurality of targets located at distances corresponding to n pulses of the local beam, and hence can measure target velocities and the like of individual targets. In this case, it is possible for the system to properly carry out the velocity distribution measurement or target detection measurement by appropriately setting the delay times between the individual delay lines 32-i and the number n of the individual delay lines 32-1–32-n of the delay line 11.

Incidentally, the delay line 11 can be reduced in size by employing 1:n optical fiber dividers (star couplers) as the optical divider 31 and optical coupler 33, and n optical fibers with different length as the delay lines 32-1–32-n.

As described above, the present embodiment 2 offers, in addition to the advantages of the foregoing embodiment 1, an advantage of being able to achieve the velocity distribution measurement or target detection measurement of the soft target by properly selecting the delay times between the individual delay lines 32-1–32-n and their number n.

EMBODIMENT 3

Figure 7:
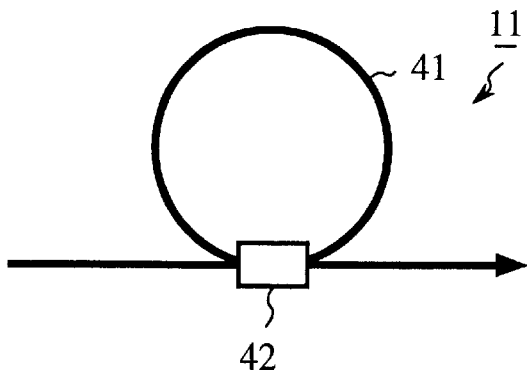
FIG. 7 is a block diagram showing a configuration of the delay line of an embodiment 3 of the coherent laser radar system in accordance with the present invention.

FIG. 7 is a block diagram showing a configuration of the delay line of an embodiment 3 of the coherent laser radar system in accordance with the present invention. The delay line 11 as shown in FIG. 7 comprises a loop line 41 for transmitting laser beam; and an optical coupler 42 for guiding an incident local beam into the loop line 41, and for dividing part of the light beam passing through the loop line 41.

Since the remaining configuration of the present embodiment 3 of the coherent laser radar system is the same as that of the embodiment 1 (see, FIG. 1), the description thereof is omitted here.

Next, the operation of the present embodiment 3 will be described.

Figure 8:
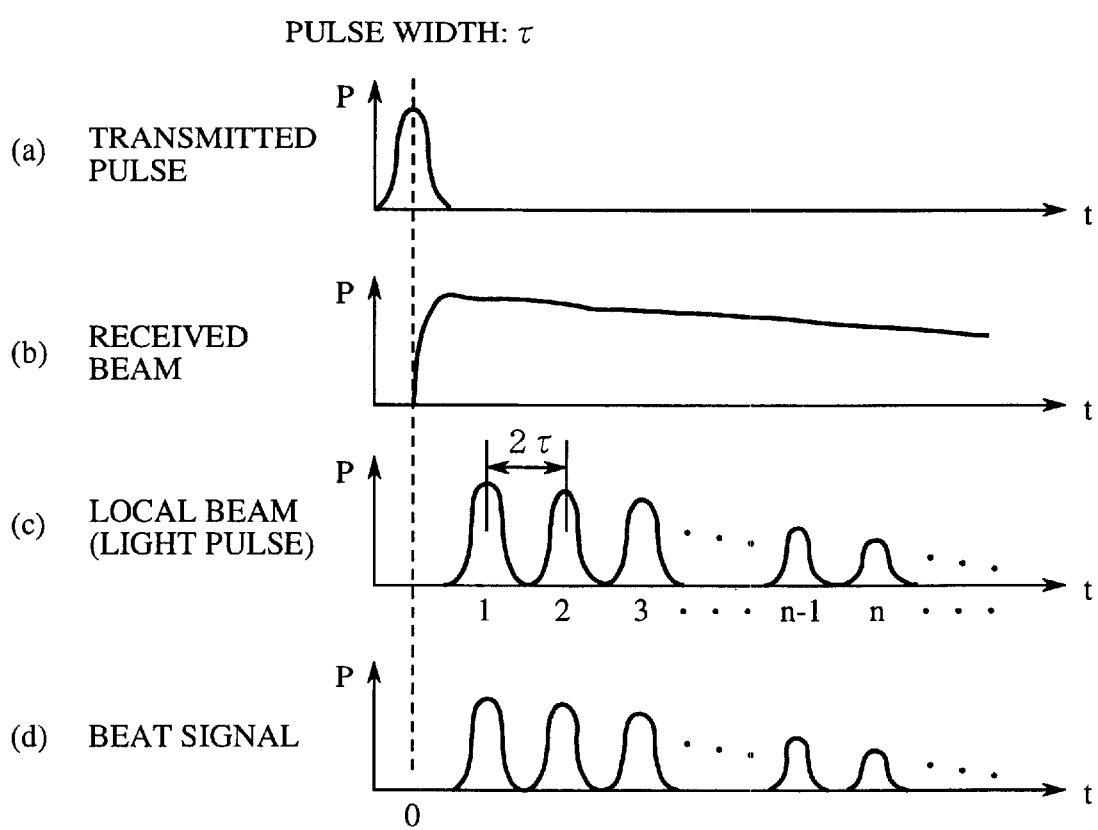
FIG. 8 is a timing chart illustrating the operation of the embodiment 3 of the coherent laser radar system.

FIG. 8 is a timing chart illustrating the operation of the embodiment 3 of the coherent laser radar system. The target in this case is assumed to be a soft target like atmosphere.

The optical coupler 42 guides the pulsed laser beam (single pulse) from the frequency shifter 10 to the ring-like loop line 41, so that the introduced pulsed laser beam travels along the loop line 41. Every time the pulsed laser beam travels around the loop line 41, the optical coupler 42 divides off its part as the local beam to be incident onto the optical coupler 8. Thus, the local beam consisting of a pulse train whose pulse interval is equal to the round-trip time of the pulsed laser beam in the loop line 41 is incident onto the optical coupler 8.

Since the remaining operation is the same as that of the embodiment 1, the description thereof is omitted here, though the time gate 22 or 25 of the signal processor 14 extracts the beat pulses corresponding to individual pulses of the local beam in accordance with the positions on the time axis, and supplies them to the FFT section 23. The FFT section 23 and Doppler frequency detector 24 compute the target velocities at the distances corresponding to the individual pulses.

As described above, the present embodiment 3 offers, in addition to the advantages of the foregoing embodiment 1, an advantage of being able to achieve the velocity distribution measurement or target detection measurement of the soft target by properly selecting the length of the loop line 41 and the dividing quantity of the optical coupler 42.

Furthermore, it has an advantage of being able to reduce the size of the delay line 11 because it consists of the single loop line 41 plus the optical coupler 42.

EMBODIMENT 4

Figure 9:
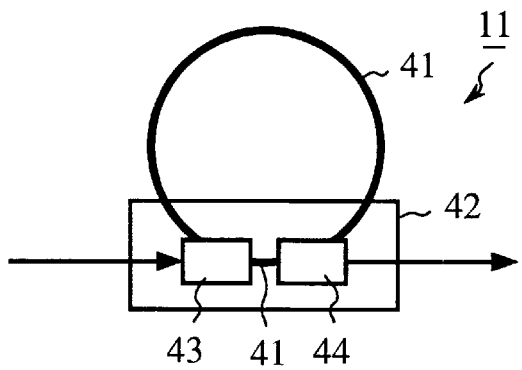
FIG. 9 is a block diagram showing a configuration of the delay line of an embodiment 4 of the coherent laser radar system in accordance with the present invention.

FIG. 9 is a block diagram showing a configuration of the delay line of an embodiment 4 of the coherent laser radar system in accordance with the present invention. The delay line 11 as shown in FIG. 9 comprises an optical switch 43 for guiding the pulsed laser beam into the loop line 41; and an optical divider 44 for outputting part of the pulsed laser beam as the local beam every time the single pulse travels around the loop line 41. In other words, the optical coupler 42 consists of the optical switch 43 and optical divider 44. Since the remaining configuration of the present embodiment 4 of the coherent laser radar system is the same as that of the embodiment 3, the description thereof is omitted here.

Here, it is possible for the optical switch 43 to have the function of the frequency shifter 10 by using an acoustooptic device as the optical switch 43. In this case, the frequency shifter 10 can be omitted.

Next, the operation of the present embodiment 4 will be described.

Figure 10:
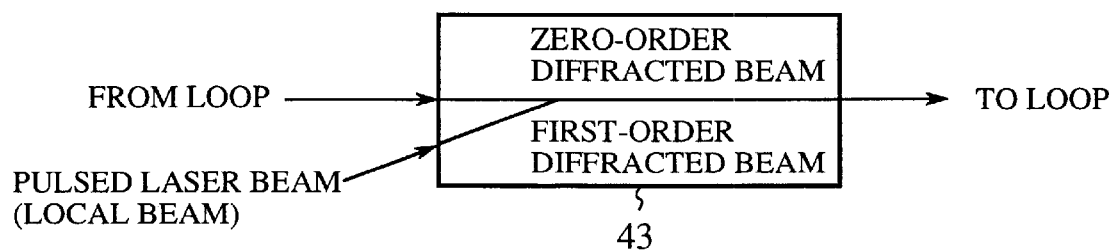
FIG. 10 is a diagram illustrating the operation of an optical switch as shown in FIG. 9.

FIG. 10 is a diagram illustrating the operation of the optical switch in FIG. 9. The optical switch 43 opens when it introduces the pulsed laser beam from the frequency shifter 10 into the loop line 41, and closes after the introduction to confine the pulsed laser beam within the loop line 41. For example, as shown in FIG. 10, it captures the pulsed laser beam as first-order diffracted light and confines the light beam within the loop line 41 as zero-order diffracted light so that the optical switch 43 can guide the pulsed laser beam into the loop line 41.

Thus, every time the pulsed laser beam travels around the loop line 41, the optical divider 44 divides its part as the local beam. Since the remaining operation is the same as that of the embodiment 3, the description thereof is omitted here.

As described above, the present embodiment 4 offers, in addition to the advantages of the foregoing embodiment 3, an advantage of being able to simplify the system by using an acoustooptic device as the optical switch because it can share the function of the frequency shifter.

EMBODIMENT 5

Figure 11:
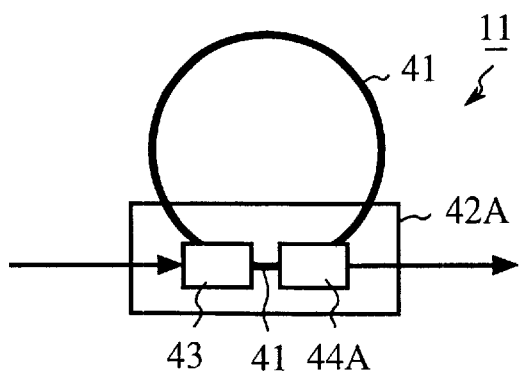
FIG. 11 is a block diagram showing a configuration of the delay line of an embodiment 5 of the coherent laser radar system in accordance with the present invention.

FIG. 11 is a block diagram showing a configuration of the delay line of an embodiment 5 of the coherent laser radar system in accordance with the present invention. In this figure, the reference numeral 42A designates a variable optical coupler comprising the optical switch 43 and a variable optical divider 44A that can control its dividing ratio. Since the remaining configuration is the same as that of the embodiment 4, the description thereof is omitted here.

Next, the operation of the present embodiment 5 will be described.

In the foregoing embodiment 3 of the coherent laser radar system, since the single pulse reduces its power every time it travels around the loop line 41 as illustrated in FIG. 8, the power of the local beam decays with the elapse of time. This can cause the power to fall below the shot noise limit, offering a problem of degrading the S/N ratio with an increase of the target distance.

In view of this, the delay line 11 of the present embodiment of the coherent laser radar system controls the output dividing ratio of the variable optical divider 44A with a controller (not shown) so that the intensity of the local beam is maintained at a fixed value, or does not decay sharply as illustrated in FIG. 8. Since the remaining operation is the same as that of the embodiment 4, the description thereof is omitted here.

As described above, the present embodiment 5 is configured such that it maintains the power of the pulsed laser beam output from the loop line 41 at about a fixed value by means of the variable optical divider 44A. This offers an advantage of being able to curb the degradation in the S/N ratio of the detected signal due to the variations in the local beam output.

EMBODIMENT 6

Figure 12:
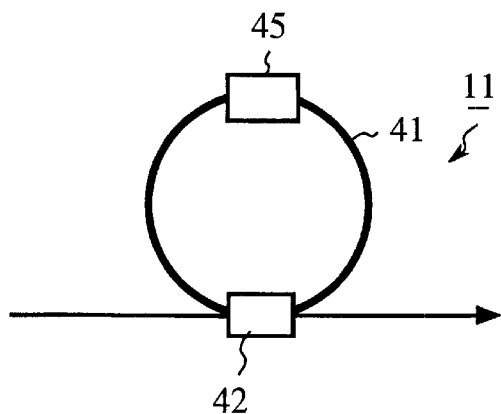
FIG. 12 is a block diagram showing a configuration of the delay line of an embodiment 6 of the coherent laser radar system in accordance with the present invention.

FIG. 12 is a block diagram showing a configuration of the delay line of an embodiment 6 of the coherent laser radar system in accordance with the present invention. In this figure, the reference numeral 45 designates an optical amplifier inserted at the midpoint of the loop line 41. Since the remaining configuration of the present embodiment 6 is the same as that of the embodiment 3, the description thereof is omitted here.

Next, the operation of the present embodiment 6 will be described.

In the foregoing embodiment 3 of the coherent laser radar system, since the power of the single pulse reduces every time it travels around the loop line 41 as illustrated in FIG. 8, the power of the local beam decays with the elapse of time. This can bring about the degradation in the S/N ratio with an increase of the target distance.

To reduce the variations in the power of the local beam, the optical amplifier 45 inserted at the midpoint of the delay line 11 amplifies the power of the single pulse traveling around the loop line 41 such that its power is maintained at a fixed value, or does not decay sharply.

Since the remaining operation is the same as that of the embodiment 3, the description thereof is omitted here.

As described above, the present embodiment 6 is configured such that it maintains the power of the pulsed laser beam in the loop line 41 at about a fixed value by means of the optical amplifier 45. This offers an advantage of being able to curb the degradation in the S/N ratio of the detected signal due to the variations in the local beam output.

Incidentally, the embodiment 6 can employ as the optical amplifier 45 any one of an optical fiber amplifier, a semiconductor optical amplifier and a laser amplifier using a solid-state laser medium, offering a similar advantage.

EMBODIMENT 7

Figure 13:
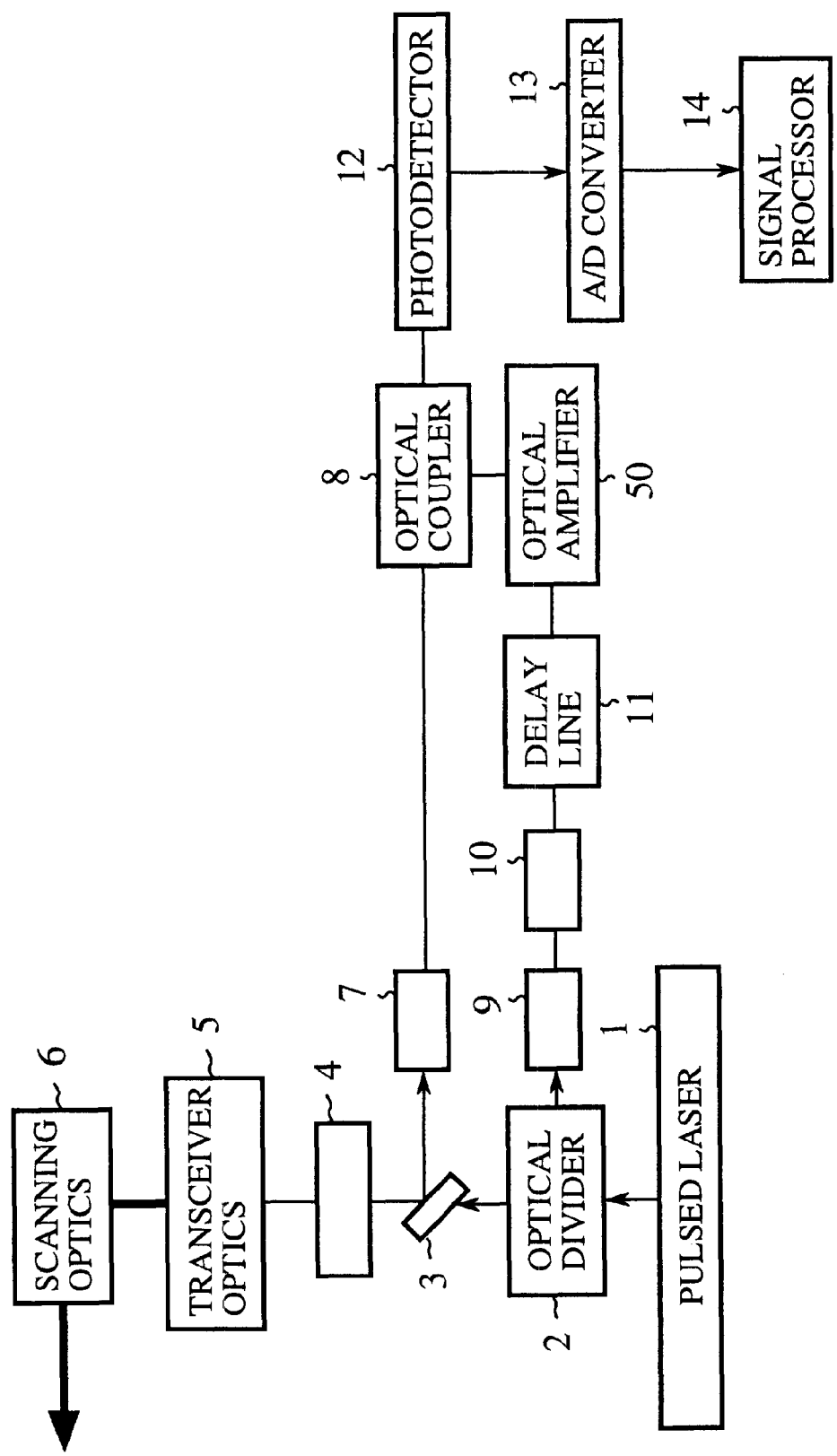
FIG. 13 is a block diagram showing a configuration of an embodiment 7 of the coherent laser radar system in accordance with the present invention.

FIG. 13 is a block diagram showing a configuration of an embodiment 7 of the coherent laser radar system in accordance with the present invention. In this figure, the reference numeral 50 designates an optical amplifier interposed between the delay line 11 and the optical coupler 8. Since the remaining configuration of FIG. 13 is the same as that of the embodiment 1, the description thereof is omitted here.

Next, the operation of the present embodiment 7 will be described.

The optical heterodyne detection can achieve the S/N ratio close to the shot noise limit by increasing the power of the local beam as high as possible. However, the power of the local beam supplied to the photodetector 12 has its own limit. Taking account of this, the power of the local beam is increased as high as possible within the saturation intensity, that is, within the limit enabling linear response. Thus, the power is set close to the saturation intensity to increase the S/N ratio of the weak received beam detection.

Figure 14:
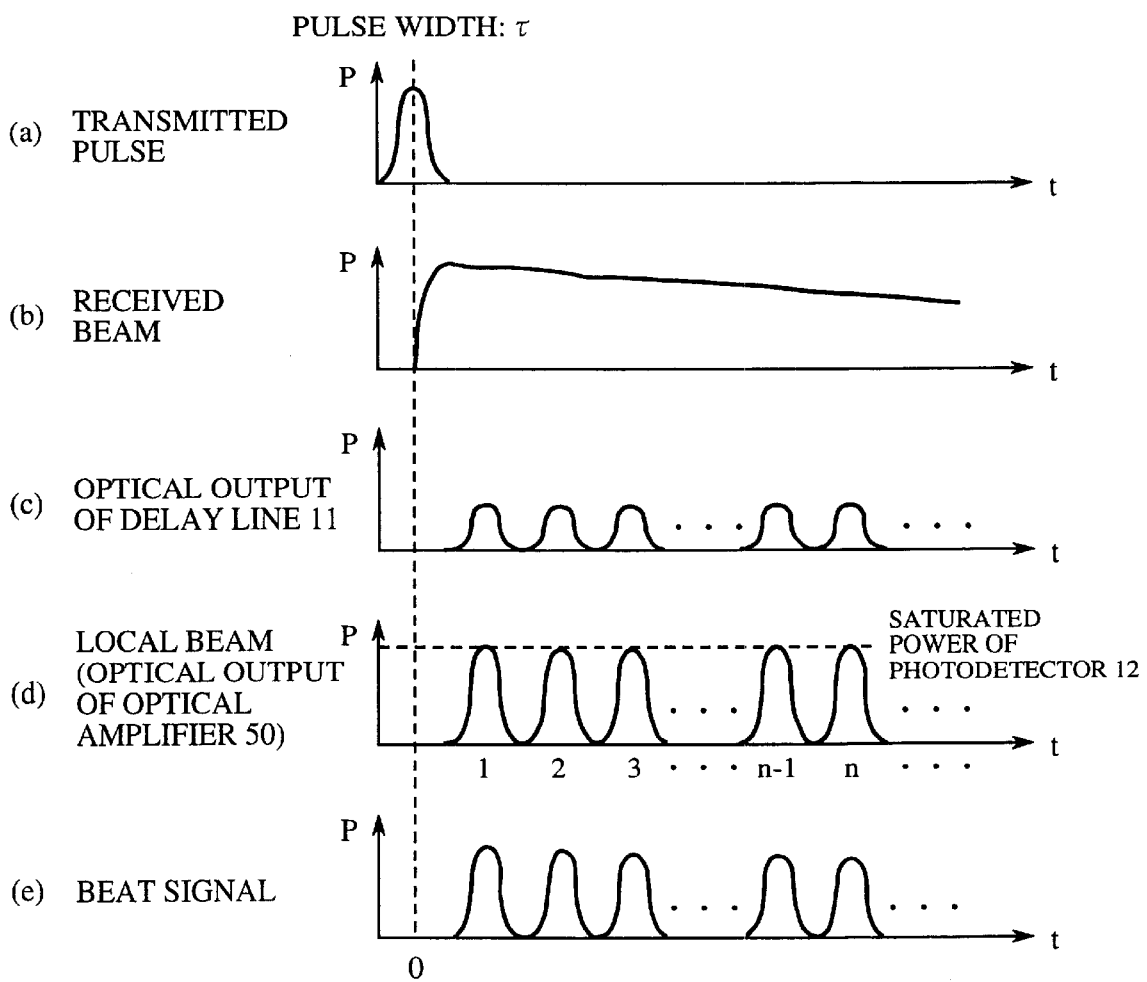
FIG. 14 is a timing chart illustrating the operation of the optical amplifier when using the delay line of the embodiment 2.
Figure 15:
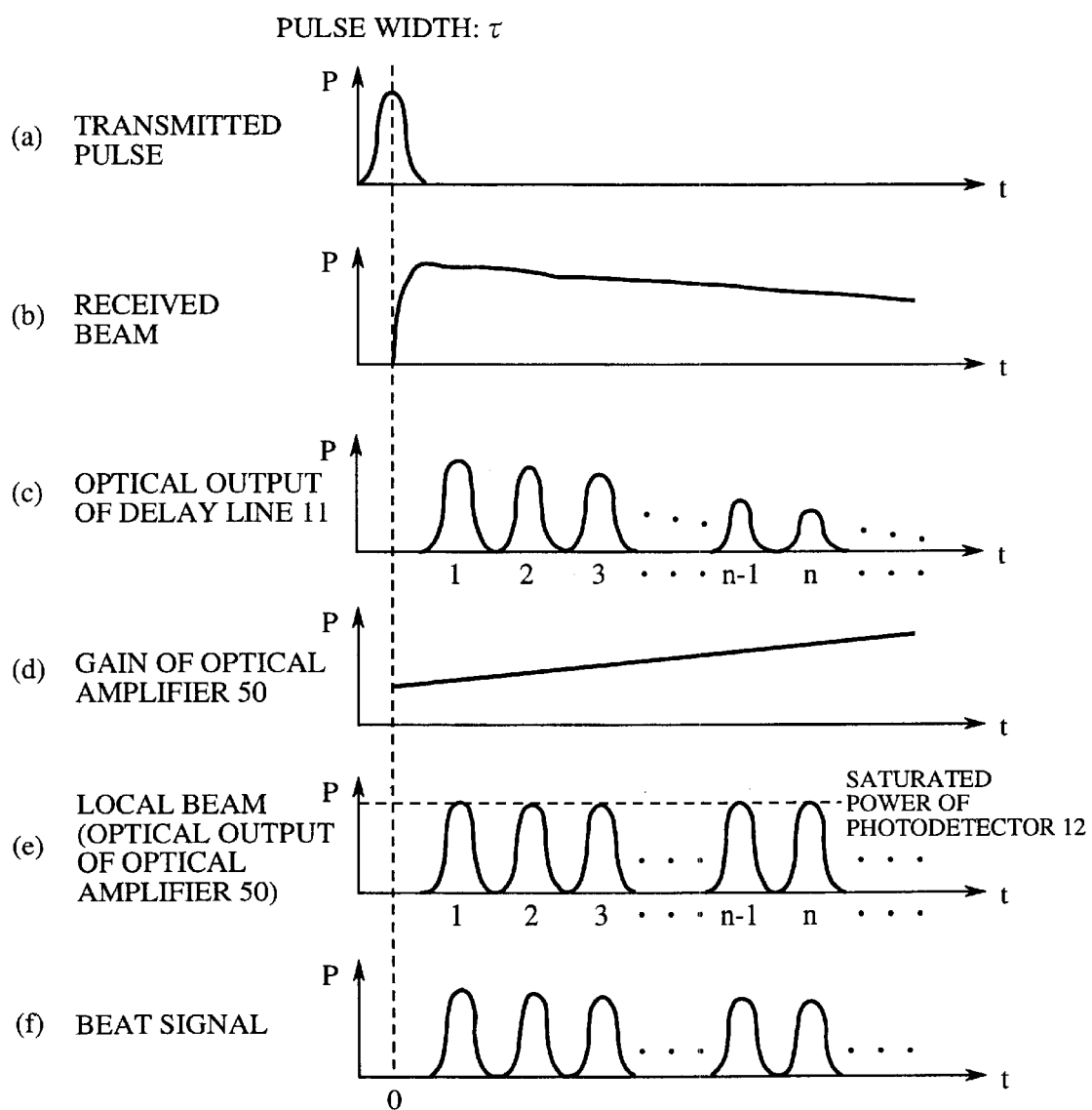
FIG. 15 is a timing chart illustrating the operation of the optical amplifier when using the delay line of the embodiment 3.
Figure 16:
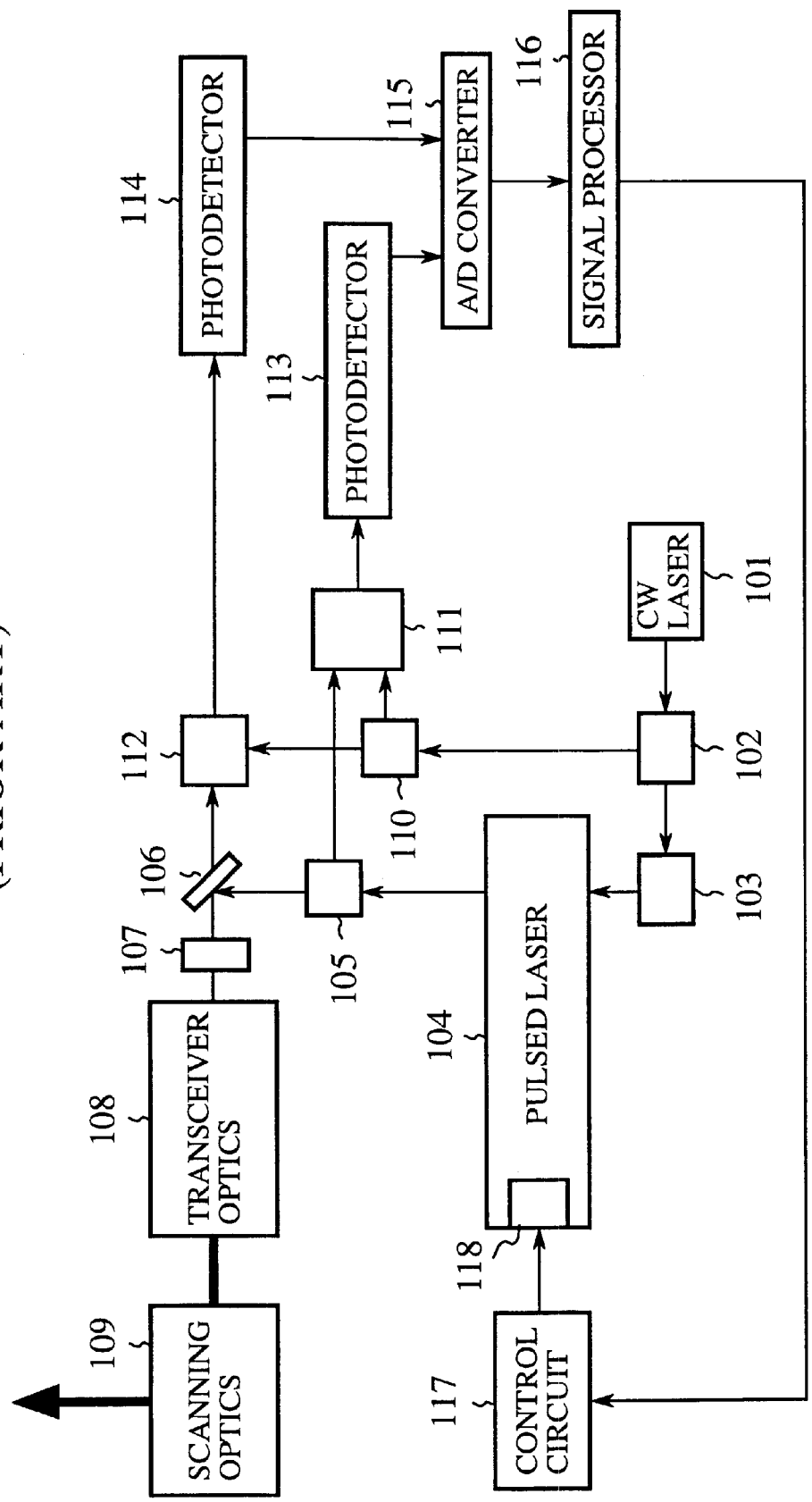
FIG. 16 is a block diagram showing a configuration of a conventional coherent laser radar system.
Figure 17:
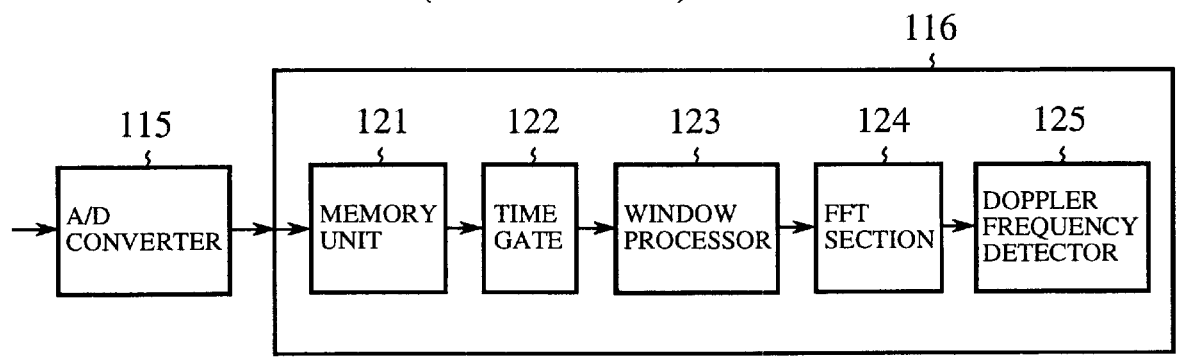
FIG. 17 is a block diagram showing a configuration of the signal processor of the conventional coherent laser radar system.
Figure 18:
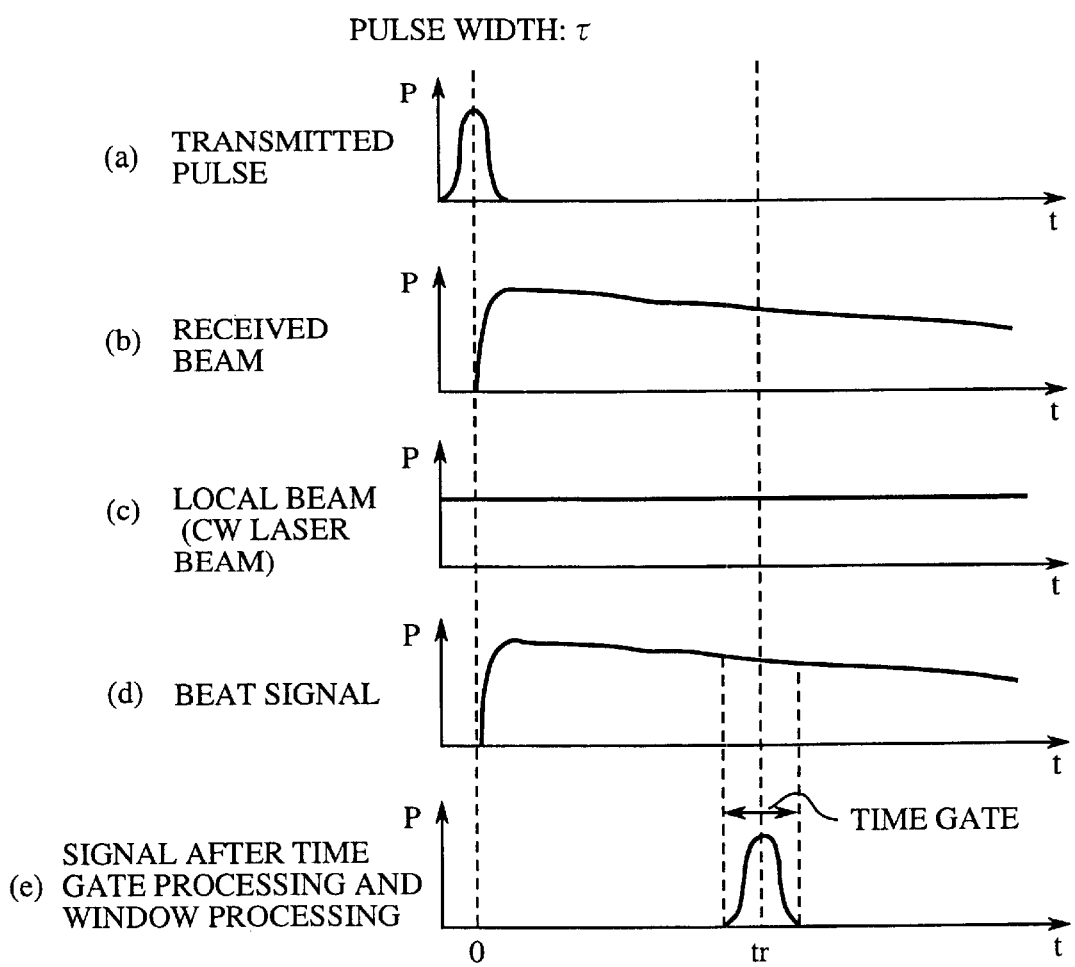
FIG. 18 is a timing chart illustrating the operation of the conventional coherent laser radar system.

FIG. 14 is a timing chart illustrating the operation of the optical amplifier 50 when using the delay line 11 of the foregoing embodiment 2 as shown in FIG. 5; and FIG. 15 is a timing chart illustrating the operation of the optical amplifier 50 when using the delay line 11 of the foregoing embodiment 3 as shown in FIG. 7.

When using the delay line 11 of the embodiment 2, the optical amplifier 50 amplifies the local beam at a fixed amplification factor as shown in FIG. 14 to maintain the power of the local beam at about the saturation intensity, and supplies the local beam to the optical coupler 8. The optical coupler 8 couples the local beam with the received beam, and the photodetector 12 carries out the coherent detection of the coupled beam.

On the other hand, when using the delay line 11 of the embodiment 3, the optical amplifier 50 amplifies the local beam at an increasing amplification factor with time as shown in FIG. 15 to maintain the power of the local beam at about the saturation intensity, and supplies the local beam to the optical coupler 8. The optical coupler 8 couples the local beam with the received beam, and the photodetector 12 carries out the coherent detection of the coupled beam.

Since the remaining operation is the same as that of the embodiment 1, the description thereof is omitted here.

As described above, the embodiment 7 comprises the optical amplifier 50 interposed between the delay line 11 and the optical coupler 8. This offers an advantage of being able to carry out the coherent detection at a high S/N ratio close to the shot noise limit. In addition, the present embodiment 7 has an advantage of being able to curb the degradation in the S/N ratio due to the variations in the power of the local beam.

What is claimed is:

1. A coherent laser radar system comprising:
   a pulsed laser for oscillating a single wavelength pulsed laser beam;
   optical dividing means for dividing the pulsed laser beam oscillated by said pulsed laser, and for outputting first part of the pulsed laser beam as a transmitted beam and second part of the pulsed laser beam as a local beam;
   transceiver optical means for transmitting the transmitted beam to a target, and for receiving a light beam from the target as a received beam;
   a delay line for delaying the local beam output from said optical dividing means;
   optical coupling means for coupling the received beam with the local beam output from said delay line;
   a photodetector for carrying out coherent detection of a light beam output from said optical coupling means; and
   a signal processor for obtaining physical information about the target from the signal passing through the coherent detection by said photodetector,
   wherein said delay line further comprises:
      an optical divider for dividing the local beam output from said optical dividing means into n local beams, where n is a positive integer greater than one;
      n delay lines for providing the n local beams with different delay times; and
      an optical coupler for coupling the n local beams delayed by said n delay lines.

2. The coherent laser radar system according to claim 1, further comprising an optical amplifier connected between said delay line and said optical coupling means for amplifying the local beam.

3. A coherent laser radar system comprising:
   a pulsed laser for oscillating a single wavelength pulsed laser beam;
   optical dividing means for dividing the pulsed laser beam oscillated by said pulsed laser, and for outputting first part of the pulsed laser beam as a transmitted beam and second part of the pulsed laser beam as a local beam;
   transceiver optical means for transmitting the transmitted beam to a target, and for receiving a light beam from the target as a received beam;
   a delay line for delaying the local beam output from said optical dividing means; optical coupling means for coupling the received beam with the local beam output from said delay line;
   a photodetector for carrying out coherent detection of a light beam output from said optical coupling means; and
   a signal processor for obtaining physical information about the target from the signal passing through the coherent detection by said photodetector, wherein said delay line further comprises:
      a loop line;
      an optical coupler for guiding the local beam output from said optical dividing means into said loop line, and for dividing part of the local beam traveling around said loop line; and
      an optical amplifier at a midpoint of said loop line.

4. The coherent laser radar system according to claim 3, wherein said optical amplifier is an optical fiber amplifier.

5. The coherent laser radar system according to claim 3, wherein said optical amplifier is a semiconductor optical amplifier.

6. The coherent laser radar system according to claim 3 wherein said optical amplifier is a laser amplifier composed of a solid-state laser medium.

7. A coherent laser radar system comprising:
- a pulsed laser for oscillating a single wavelength pulsed laser beam;
- optical dividing means for dividing the pulsed laser beam oscillated by said pulsed laser, and for outputting first part of the pulsed laser beam as a transmitted beam and second part of the pulsed laser beam as a local beam;
- transceiver optical means for transmitting the transmitted beam to a target, and for receiving a light beam from the target as a received beam;
- a delay line for delaying the local beam output from said optical dividing means;
- optical coupling means for coupling the received beam with the local beam output from said delay line;
- a photodetector for carrying out coherent detection of a light beam output from said optical coupling means; and
- a signal processor for obtaining physical information about the target from the signal passing through the coherent detection by said photodetector,
- wherein said delay line further comprises:
  - a loop line;
  - an optical coupler for guiding the local beam output from said optical dividing means into said loop line, and for dividing part of the local beam traveling around said loop line, and wherein said optical coupler is a variable optical coupler whose dividing ratio is variable.

8. A coherent laser radar system comprising:
- a pulsed laser for oscillating a single wavelength pulsed laser beam;
- optical dividing means for dividing the pulsed laser beam oscillated by said pulsed laser, and for outputting first part of the pulsed laser beam as a transmitted beam and second part of the pulsed laser beam as a local beam;
- transceiver optical means for transmitting the transmitted beam to a target, and for receiving a light beam from the target as a received beam;
- a delay line for delaying the local beam output from said optical dividing means;
- optical coupling means for coupling the received beam with the local beam output from said delay line;
- a photodetector for carrying out coherent detection of a light beam output from said optical coupling means; and
- a signal processor for obtaining physical information about the target from the signal passing through the coherent detection by said photodetector, wherein said delay line further comprises:
  - a loop line;
  - an optical coupler for guiding the local beam output from said optical dividing means into said loop line, and for dividing part of the local beam traveling around said loop line, and wherein said optical coupler comprises:
- an optical switch consisting of an acoustooptic device for supplying said loop line with local beam output from said optical dividing means and the local beam traveling around said loop line; and
- an optical divider for dividing the local team traveling around said loop line.

9. A coherent laser radar system comprising:
- a pulsed laser for oscillating a single wavelength pulsed laser beam;
- optical dividing means for dividing the pulsed laser beam oscillated by said pulsed laser, and for outputting first part of the pulsed laser beam as a transmitted beam and second part of the pulsed laser beam as a local beam;
- transceiver optical means for transmitting the transmitted beam to a target, and for receiving a light beam from the target as a received beam;
- a delay line for delaying the local beam output from said optical dividing means;
- optical coupling means for coupling the received beam with the local beam output from said delay line;
- a photodetector for carrying out coherent detection of a light beam output from said optical coupling means; and
- a signal processor for obtaining physical information about the target from the signal passing through the coherent detection by said photodetector, wherein said delay line comprises:
  - a loop line;
  - an optical coupler for guiding the local beam output from said optical dividing means into said loop line, and for dividing part of the local beam traveling around said loop line,
- and wherein said coherent laser radar system further comprises an optical amplifier connected between said delay line and said optical coupling means for amplifying the local beam.

* * * * *